United States Patent [19]

Park

[11] Patent Number: 5,129,275

[45] Date of Patent: Jul. 14, 1992

[54] PAIR OF SEMI-SPHERICAL BEVEL GEARS

[76] Inventor: Dong Kyu Park, 119-5, 5-Ka, Dongseomun-Dong, Sungpuk-Ku, Seoul

[21] Appl. No.: 593,653

[22] Filed: Oct. 3, 1990

[30] Foreign Application Priority Data

Feb. 28, 1990 [KR] Rep. of Korea .................. 90-2626

[51] Int. Cl.⁵ .................... F16H 1/20; F16H 1/12
[52] U.S. Cl. ........................... 74/417; 74/423; 464/109
[58] Field of Search ............ 74/417, 423, 424, 89.13; 464/73, 157, 159, 109

[56] References Cited

U.S. PATENT DOCUMENTS 305,714  9/1884  Schulze-Berge ............... 464/109 X
1,196,268  8/1916  Noel ............................... 464/157

FOREIGN PATENT DOCUMENTS 3724525  5/1988  Fed. Rep. of Germany ...... 464/109
57-94132  6/1982  Japan .............................. 464/109

Primary Examiner—Allan D. Hermann
Assistant Examiner—Julie Krolikowski

[57] ABSTRACT

A pair of semi-spherical bevel gears comprising a plurality of gear teeth and grooves radially arranged within an angle of 360° which are formed by driving shaft and a driven shaft through the mutual contact of the pair of semi-spherical bevel gears, and a hollow boss disposed in a gear head of the gears for receiving the shafts therein for forming a hollow portion so as to contain a coil spring, respectively.

4 Claims, 5 Drawing Sheets

PAIR OF SEMI-SPHERICAL BEVEL GEARS

BACKGROUND OF THE INVENTION

1. Field of the Invention

The present invention relates to a pair of semi-spherical bevel gears and more particularly, to a pair of bevel gears which include a plurality of gear teeth and grooves radially disposed in the surface thereof from the summit thereof, respectively, so as to be in gearing relationship from each other at a variable angle for use in various types of machines, machine tools, control machines, testing machines, medical machines, robots, toys, and the like as a driving force transmitter.

2. Description of the Prior Art

Generally, a pair of conventional spur gears have a driving shaft and a driven shaft with a plurality of teeth, respectively, for gearing with each other in parallel so that only the ratio of rotation and the direction of the rotation are changeable. However, the gearing intersection angle of the two shafts cannot be change or varied.

Also, the conventional bevel gears can change in an engagement intersection angle of two shafts of the pair of conventional bevel gears. However, the engagement angle of such pair of bevel gears is determined according to an angle of the pitch circle. For example, when the angle of the pitch circle is 45°, the gearing intersection angle of two shafts becomes a right angle. When the angle of the pitch circle is 35°, the gearing intersection angle of two shafts becomes 70°. Therefore, if once the gearing intersection angle is determined when the gears are designed and manufactured, the gearing intersection angle of the rotation cannot change any further. That is, it is not variable.

Also, conventional universal coupling devices wherein a pair of shafts intersect in a variable angle. However, the extent of variable intersection angle is within the limit of about 30°. Furthermore, over the angular limit, the desired speed of rotation of the gears cannot be attained.

In such conventional gearing devices, the variable gearing intersection angle of the pair of shafts of the gearing devices during rotation is not taken into consideration at all. Only the strengthening of gear teeth for desirable gearing with each other has been considered. However, the displacement of the contact point of the pair of teeth of gears is not drawn any attention. Also, as a matter of fact, there are a number of requirements to moderate the strength of teeth and variable gearing intersection angle of the pair of gear shafts. In order to solve the requirements, the conventional multi-stage bevel gears are utilized. However, there are a number of disadvantages, for example, it is complicated in construction and expensive to manufacture.

SUMMARY OF THE INVENTION

Accordingly, it is an object of the present invention to provide an improved pair of semi-spherical bevel gears.

Another object of the present invention is to provide a pair of semi-spherical bevel gears comprising a pair of semi-spherical body members, teeth and grooves radially extending from each summit of the semi-spherical body members, and a hollow head of each semi-spherical body members for receiving a coil so as to transmit the driving force during mutual contact of the bevel gears.

A further object of the present invention is to provide a pair of semi-spherical bevel gears which include teeth and grooves wherein the dimensions thereof increase gradually from the top of the gears to the base of the gears so that the intersection angle of the pair of gears is variable.

Still another object of the present invention is to provide a semi-spherical bevel gear further comprising a shaft of one bevel gear intersected with a shaft of the other bevel gear in a variety during the mutual rotation, and therefore, it does not need to fix the gearing intersection angle and, at that time, the driving force can be freely transmitted in any gearing intersecting angle so that the pair of semi-spherical bevel gears can be used as a gearing transmitter for various applications.

Yet another object of the present invention is to provide a pair of semi-spherical bevel gears which is simple in construction, easy in use, and inexpensive to manufacture.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a pair of semi-spherical bevel gears comprising a plurality of gear teeth and grooves radially arranged within an angle of 360° which are formed by a driving shaft and a driven shaft through the mutual contact of the pair of semi-spherical bevel gears, and a hollow boss disposed in a gear head of the gears for receiving the shafts therein for forming a hollow portion so as to contain a coil spring, respectively.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
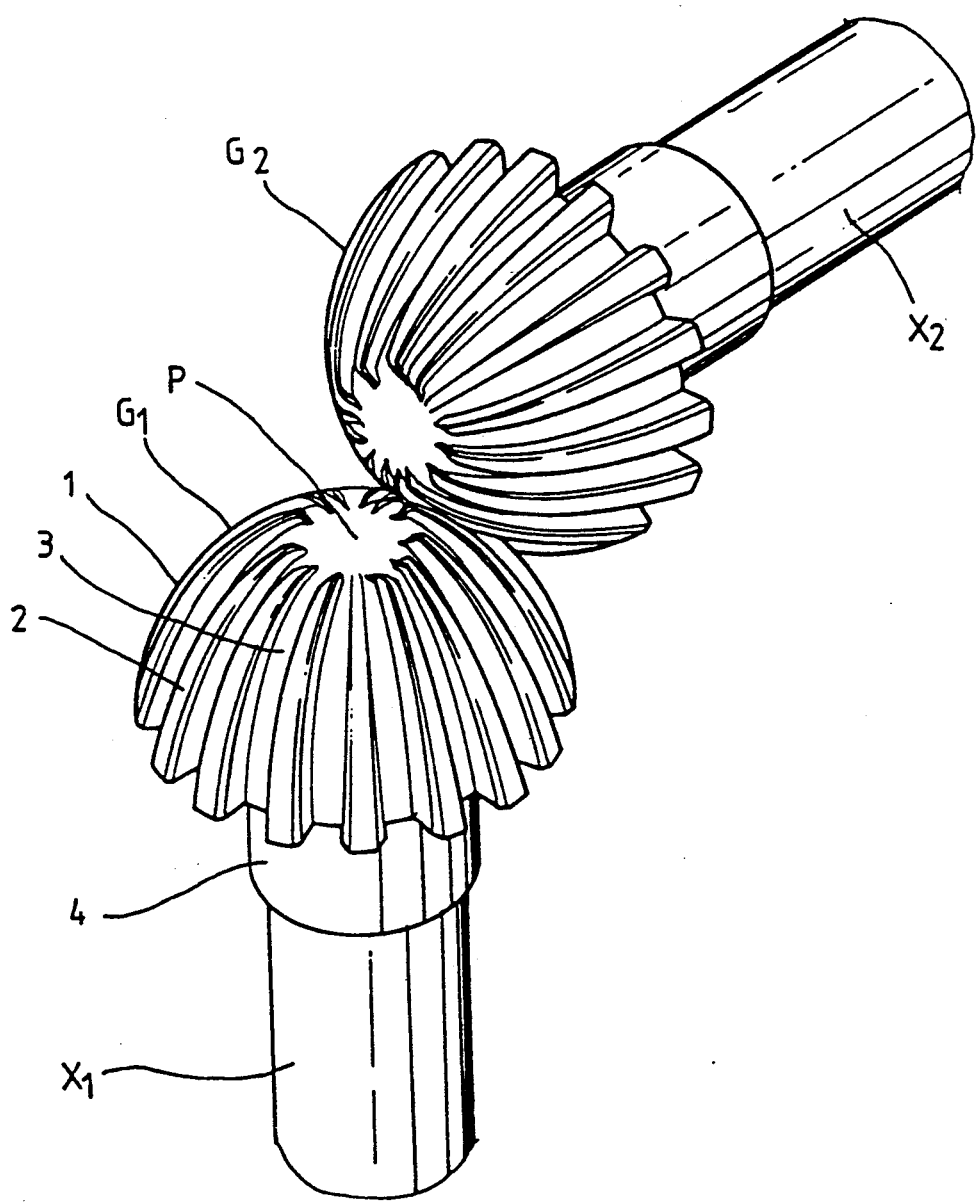
FIG. 1 is a front view of the pair of semi-spherical bevel gears of the present invention.
Figure 2:
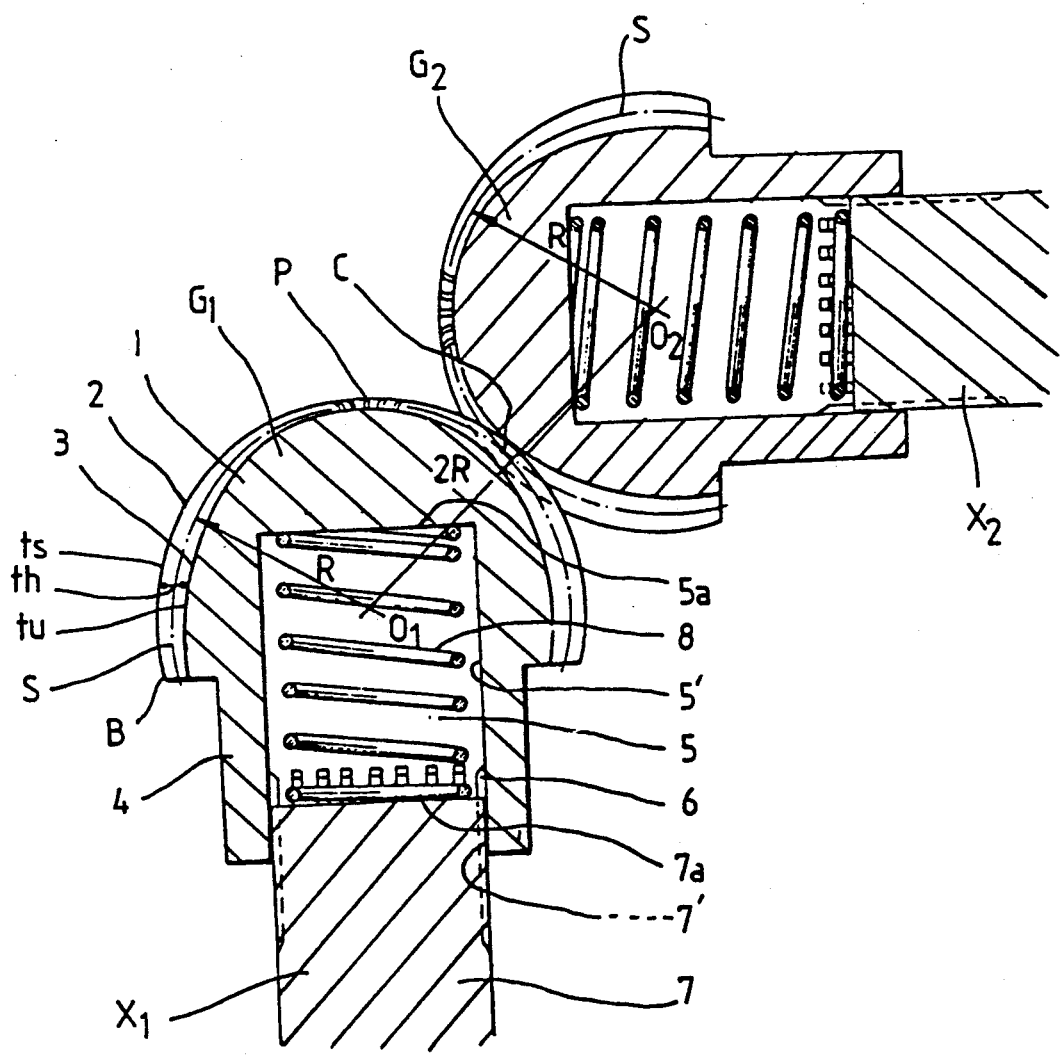
FIG. 2 is a sectional view of a pair of semi-spherical bevel gears disposed in gearing relationship with each other at right angle between each other according to the present invention.

Referring now in detail to the drawings for the purpose of illustrating preferred embodiments of the present invention, the pair of semi-spherical bevel gears $G_1$ and $G_2$ as shown in FIGS. 1 and 2, comprise a driving shaft $X_1$, a driven shaft $X_2$, and a semi-spherical body member 1 having a plurality of gear teeth 2 and grooves 3 which are longitudinally and radially configured from a summit p to a bottom end B thereof. A center circle S of the dotted line has a half circular configuration with a radius R from a center point $0_1$ of the semi-spherical body member 1 and the center of the semi-sphere becomes the center of the teeth 2 and grooves 3 (FIG. 2). A surface ts of the teeth 2 and bottom tu of the teeth 2 and grooves 3 forms a curved surface with regard to the center circle S. On the basis of the center circle S, there is the nearer to the summit P, the lower of the height th of the teeth 2, and also the nearer to the bottom B, the higher. The heights of the teeth 2 are considered to comply with the corresponding latitudinal length cut by a flat plane in parallel to a tangent plane from the summit P of the spherical body member 1 for attaining the smooth rotation when the intersection angle is varied by the spherical contact of semi-spherical bevel gears $G_1$ and $G_2$. Even if the teeth 2 of the bevel gears $G_1$ or $G_2$ are shown radially in the drawings, other forms of the teeth arrangements such as a helical or spiral form can be applied as long as the semi-spherical bevel gears $G_1$ and $G_2$ are maintained. That is, such types of the gear teeth 2 can be varied according to its geometrical preferences.

A boss 4 extends from the bottom portion of the gear body member 1, which has a hollow configured portion 5 disposed from the bottom of gear body member 1 and disposed under the summit P. Around an inside wall 5' of the hollow portion 5, a plurality of elongated ridges 6 are provided in the longitudinal direction for mating with a plurality of corresponding elongated channels 7' disposed on the shaft 7 so as to be inserted around the surface of the shaft 7. Therefore, the ridges 6 and channels 7' do not separate from the engagement thereof even though there is certain sliding in the longitudinal direction. The hollow portion 5 of the boss 4 is provided with a chamber formed by engaging the elongated pins 6 of the inside wall 5' with the elongated channels 7' for the shaft 7 containing a coil spring 8. At this time, one end of the coil spring 8 pushes against a hollow end 5a of the hollow portion 5 and other end of the coil spring 8 pushes against the shaft end 7a of the shaft 7. Therefore, the bevel gears $G_1$ $_{and}$ $_{G2}$ can move elastically in a limited extent. By this way, any irregularity in the distance 2R between the center points $0_1$ and $0_2$ can be compensated smoothly when the pair of bevel gears $G_1$ and $G_2$ are engaged and the gearing intersection angle between the driving shaft $X_1$ and driven shaft $X_2$ are changed.

Figure 4:
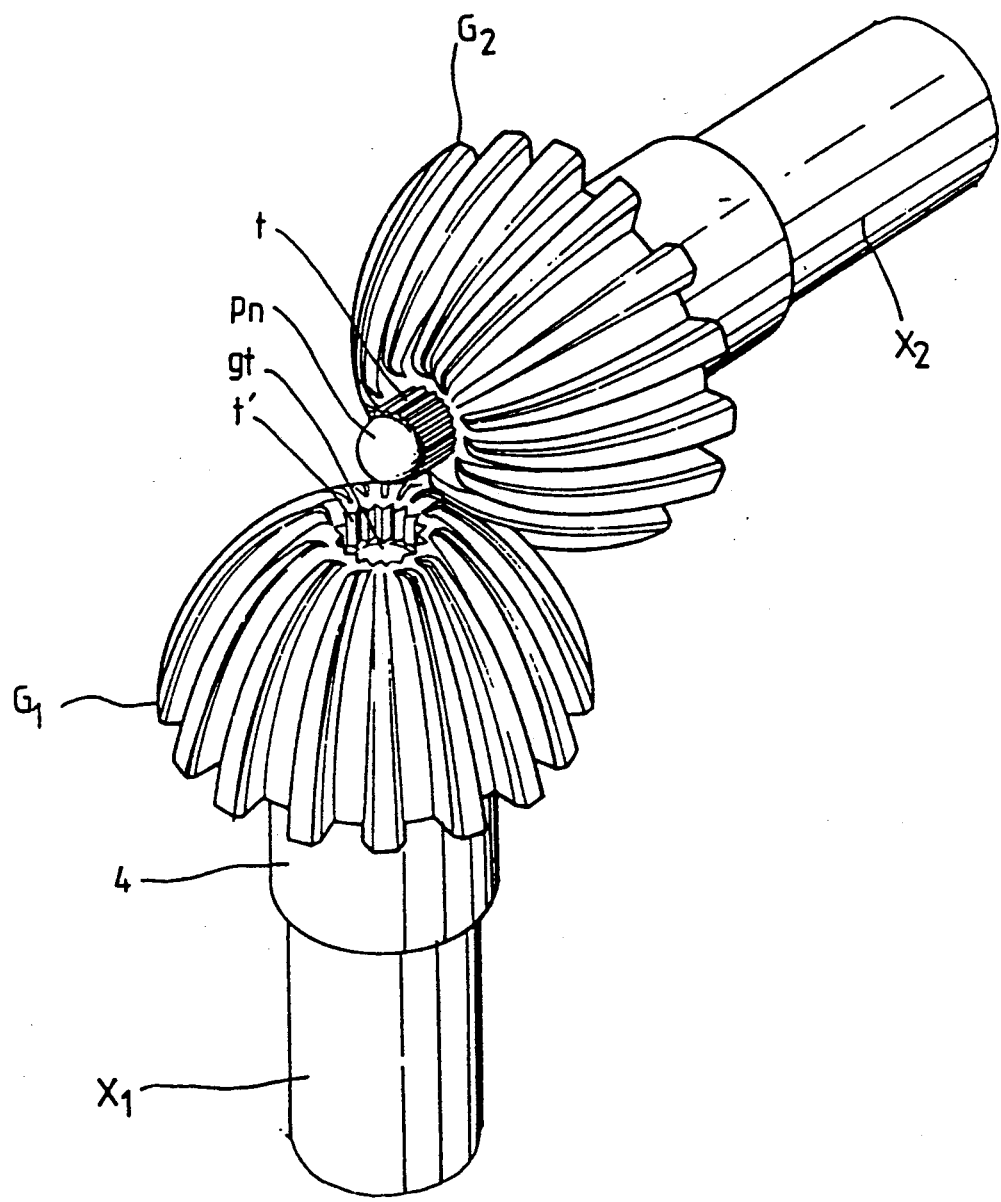
FIG. 4 is a perspective view of the pair of semi-spherical bevel gears which are disposed in gearing relationship with each other through a plurality of teeth of a pin extending from the top of one semi-spherical bevel gear and a plurality of teeth of a tubular member of the top of the other semi-spherical bevel gear of the present invention.
Figure 5:
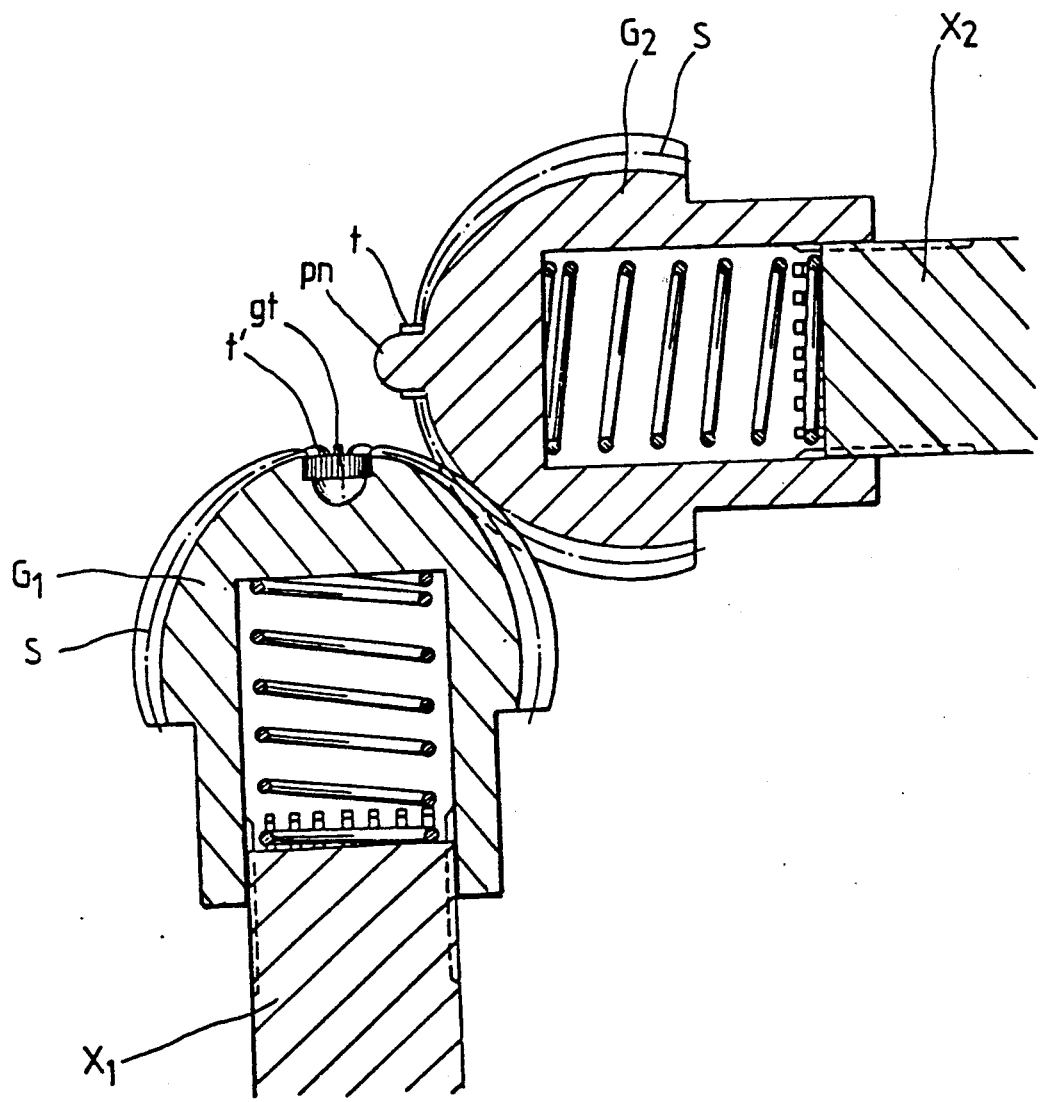
FIG. 5 is a sectional view of FIG. 4 showing the basic construction of the another embodiment of the present invention.

As shown in FIG. 4 and FIG. 5, the bevel gears of the another embodiment of the present invention comprises a sunk portion gt having female teeth t' disposed in the top of one bevel gear $G_1$ and an insert pin pn having male teeth t disposed in the top of the other bevel gear $G_2$. When the pair of shafts 7 intersect at 180°, the engagement of the teeth 2 and grooves 3 of the pair of bevel gears $G_1$ and $G_2$ are finished and simultaneously, the engagement of the male teeth t of the insert pin pn and the female teeth t' of the sunk portion gt achieve the straight line of the pair of shafts 7.

The pair of semi-spherical gears of the present invention operates as follows.

Figure 3:
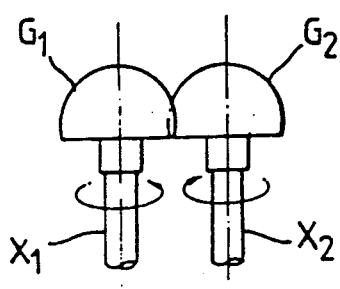
FIG. 3(A) is a front elevational view of the pair of semi-spherical bevel gears disposed in parallel to each other.
FIG. 3(B) is a front elevational view of the pair of semi-spherical bevel gears disposed at an intersection angle of 45° between each other.
FIG. 3(C) is a front elevational view of the pair of semi-spherical bevel gears disposed at an intersection angle of 90° between each other.
FIG. 3(D) is a front elevational view of the pair of semi-spherical bevel gears disposed at an intersection angle of 135° between each other.
FIG. 3(E) is a front elevational view of the pair of semi-spherical bevel gears disposed in a symmetrical position between each other.
FIG. 3(F) is a front elevational view of the pair of semi-spherical bevel gears disposed at an intersection angle of 225° between each other.
Figure 3:
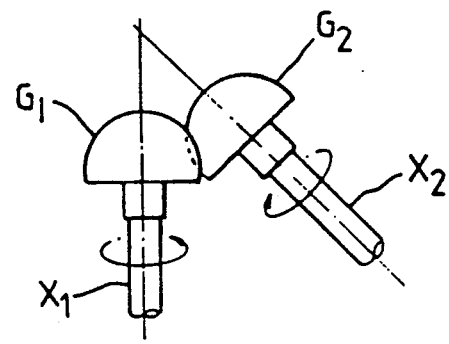
Figure 3:
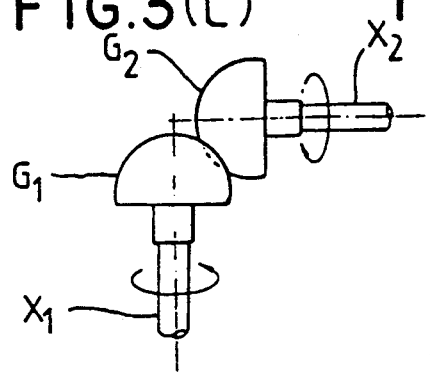
Figure 3:
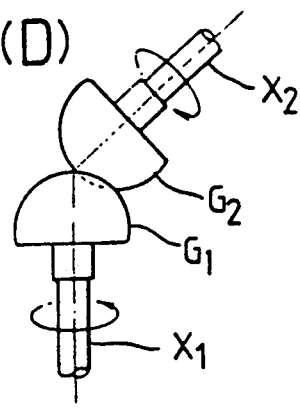
Figure 3:
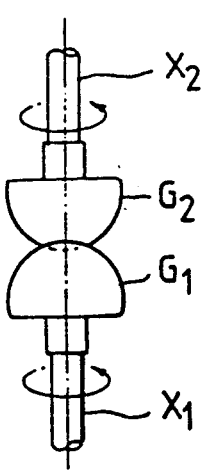
Figure 3:
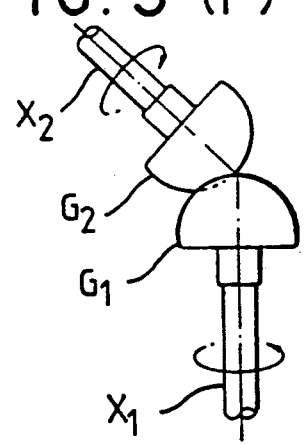

FIG. 3 shows a variety of gearing intersection angles of the pair of bevel gears $G_1$ and $G_2$ of the present invention. Since the driving shaft $X_1$ and the driven shaft $X_2$ are connected to their power transmission system and the pair of bevel gears $G_1$ and $G_2$ are engaged through the teeth 2 and the grooves 3, the driving force of the driving shaft $X_1$ is transmitted to the driven shaft $X_2$. They can be used in a fixed intersection angle, or they can be used in a case that the driving shaft $X_1$ is fixed and the driven shaft $X_2$ is variable. In any cases, the function of the pair of bevel gears $G_1$ and $G_2$ is identical. For example, as shown in FIG. 3(A), the teeth 1 of the pair of semi-spherical bevel gears $G_1$ and $G_2$ are engaged at the bottom portion of the teeth 1 so as to transmit the driving force in case that the pair of shafts $X_1$ and $X_2$ are positioned in parallel. In this state, when the gearing intersection angle of the pair of shafts $X_1$ and $X_2$ changes to 45° whereas they are rotating or stopped, a contact point C of the teeth 2 and grooves 3 of the pair of semi-spherical bevel gears $G_1$ and $G_2$ is displaced upward.

As far as the teeth 2 and grooves 3 of the pair of gears $G_1$ and $G_2$ are engaged, the function of the driving force transmission of the pair of shafts $X_1$ and $X_2$ is maintained all the same. Also, as shown in FIG. 3(C), when the intersection angle of the pair of shafts $X_1$ and $X_2$ becomes a right angle, the contact point C of the teeth 2 and grooves 3 of the pair of bevel gears $G_1$ and $G_2$ is located in the middle portion thereof and the function of the driving force transmission between the pair of shafts $X_1$ and $X_2$ maintained. And also, when the intersection angle is changed into 135° as shown in FIG. 3(D) and 225° in FIG. 3(F), the contact point C is displaced almost near the summit P. In this case, the function of the driving force transmission of the pair of shafts $X_1$ and $X_2$ is maintained the same as far as the teeth 2 and grooves 3 are engaged. In the above facts, the direction of the rotations of the pair of shafts $X_1$ and $X_2$ are reversed each other and the intersection angles can be arbitrarily varied even if the pair of shafts $X_1$ and $X_2$ are rotated. In case that the pair of shafts $X_1$ and $X_2$ are intersected at 180° as shown in FIG. 3(E), the pair of shafts $X_1$ and $X_2$ are aligned in a single shaft and accordingly, the pair of teeth 2 and grooves are disengaged and simultaneously, the teeth 2 of the sunk part gt and the insert pin pn are engaged each other and driving shaft $X_1$ and the driven shaft $X_2$ becomes a single shaft. Therefore, the direction of rotation becomes same and actually gearing function disappears. As mentioned above, the semi-spherical bevel gears $G_1$ and $G_2$ of the present invention can be used with any fixed intersection angle or with one shaft fixed and the other shaft arbitrarily varied. The function of the driving force transmission is maintained in spite of variable intersection angles of the pair of shafts $X_1$ and $X_2$. The present invention is relatively simple in construction compared with the conventional bevel gears and can be used in machine tools, control machines, scientific experiment machines, robots, toys, and other high technology scientific apparatus.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A pair of semi-spherical bevel gears, each of the pair of semi-spherical bevel gears comprising:
    a semi-spherical body member having a boss,
    a plurality of gear teeth disposed on an outer surface of said semi-spherical body member,
    a plurality of grooves disposed on said outer surface of said semi-spherical body member alternatively arranged with said plurality of gear teeth,
    a hollow portion disposed in said boss, said hollow portion being provided with a plurality of elongated ridges disposed in an end portion of the interior thereof, and
    a shaft having a plurality of elongated channels disposed around an end portion thereof for engaging with the plurality of elongated ridges so as to form a chamber in the hollow portion for receiving a coil spring when the shaft is inserted into the hollow portion, whereby said plurality of gear teeth and grooves are radially arranged so as to transmit the driving force to each other such that the intersection angle of said pair of bevel gears is variable.

2. The pair of semi-spherical bevel gears of claim 1, wherein the dimensions of the teeth and grooves increase gradually from the top of said gears to the base of said gears.

3. A pair of semi-spherical bevel gears, each of said semi-spherical bevel gears comprising:
    a semi-spherical body member having a boss,
    a pin member which extends from a summit of one of said semi-spherical body members, said pin having a plurality of male teeth,
    a plurality of gear teeth disposed on an outer surface of said semi-spherical body member,
    a slot member extending from said summit of the other of said semi-spherical body members, said slot member having a plurality of female teeth for engaging with said pin member when said pin member is inserted therein, and
    a shaft having a plurality of elongated channels disposed around an end portion thereof for engaging with a plurality of elongated ridges disposed in an end portion of an interior of a hollow portion disposed in said boss so as to form a space for receiving a coil spring when said shaft is inserted into said hollow portion, whereby said plurality of teeth and grooves are radially arranged within a gearing intersection angle of 360° and optionally 180° so as to transmit the driving force from each other such that the intersection angle of said bevel gears is variable.

4. The pair of semi-spherical bevel gears of claim 3, wherein the dimensions of the teeth and grooves increase gradually from the top of said gears to the base of said gears.

* * * * *